United States Patent [19]
Bala et al.

[11] Patent Number: 5,490,531
[45] Date of Patent: Feb. 13, 1996

[54] APPARATUS FOR REMOVING HYDROCARBON CONTAMINANTS FROM SOLID MATERIALS

[75] Inventors: Gregory A. Bala; Charles P. Thomas, both of Idaho Falls, Id.

[73] Assignee: Lockheed Idaho Technologies Company, Idaho Falls, Id.

[21] Appl. No.: 442,031

[22] Filed: May 16, 1995

Related U.S. Application Data

[62] Division of Ser. No. 198,076, Feb. 17, 1994, Pat. No. 5,454,878.

[51] Int. Cl.$^6$ ........................................ B08B 3/12
[52] U.S. Cl. ................... 134/109; 134/104.4; 210/787; 210/781
[58] Field of Search .................... 134/105, 107, 134/108, 102.1, 111, 109, 19, 201, 104.4; 210/688, 638, 723, 787, 781, 181, 511, 512.2, 180; 175/66, 206

[56] References Cited

U.S. PATENT DOCUMENTS

| | | | |
|---|---|---|---|
| 3,152,979 | 10/1964 | Bichard et al. | 208/11 |
| 4,132,010 | 1/1979 | Deland | 134/123 |
| 4,208,285 | 6/1980 | Sample, Jr. | 210/180 |
| 4,460,292 | 7/1984 | Durham, Jr. | 405/129 |
| 4,585,753 | 4/1986 | Scott et al. | 502/401 |
| 4,595,422 | 6/1986 | Hill et al. | 134/105 |
| 4,678,558 | 7/1987 | Belluteau et al. | 208/390 |
| 4,781,944 | 11/1988 | Jones | 427/228 |
| 4,836,302 | 6/1989 | Heilhecker et al. | 175/66 |
| 4,844,106 | 7/1989 | Hunter et al. | 134/111 |
| 4,998,848 | 3/1991 | Hansen | 405/128 |
| 5,054,506 | 10/1991 | Shakeri | 134/111 |
| 5,107,874 | 4/1992 | Flanigan et al. | 134/105 |
| 5,172,709 | 12/1992 | Eckhardt et al. | 134/102.1 |
| 5,288,330 | 2/1994 | Ballard et al. | 134/25.1 |
| 5,413,129 | 5/1995 | Shenoi | 134/111 |

FOREIGN PATENT DOCUMENTS 54-1970  1/1979  Japan .................... 134/104.4

OTHER PUBLICATIONS

McCabe et al., "United Operations of Chemical Engineering", Third Edition 1976, pp. 621 and 956.
Perry et al., "Chemical Engineers Handbook", Fifth Edition, 1973 pp. 19–43 thru 19–60.

*Primary Examiner*—Frankie L. Stinson
*Attorney, Agent, or Firm*—Klaas, Law, O'Meara & Malkin

[57] ABSTRACT

A system for removing hydrocarbons from solid materials. Contaminated solids are combined with a solvent (preferably terpene based) to produce a mixture. The mixture is washed with water to generate a purified solid product (which is removed from the system) and a drainage product. The drainage product is separated into a first fraction (consisting mostly of contaminated solvent) and a second fraction (containing solids and water). The first fraction is separated into a third fraction (consisting mostly of contaminated solvent) and a fourth fraction (containing residual solids and water). The fourth fraction is combined with the second fraction to produce a sludge which is separated into a fifth fraction (containing water which is ultimately reused) and a sixth fraction (containing solids). The third fraction is then separated into a seventh fraction (consisting of recovered solvent which is ultimately reused) and an eighth fraction (containing hydrocarbon waste).

7 Claims, 4 Drawing Sheets

APPARATUS FOR REMOVING HYDROCARBON CONTAMINANTS FROM SOLID MATERIALS

CONTRACTUAL ORIGIN OF THE INVENTION

The United States Government has rights in this invention disclosed under contract number DE-AC07-76ID01570 between the U.S. Department of Energy and EG&G Idaho, Inc., now contract number DE-AC07-94ID13223 with Lockheed Idaho Technologies Company.

CROSS-REFERENCE TO RELATED APPLICATION

This is a division application of Ser. No. 08/198,076, filed Feb. 17, 1994, now U.S. Pat. No. 5,454,878.

BACKGROUND OF THE INVENTION

The present invention generally relates to the decontamination of solid materials, and more particularly to the treatment of contaminated soil, gravel, sand, and other solid compositions in order to remove hydrocarbon contaminants therefrom.

Increased demand for petroleum and chemical products has resulted in the development of extensive and widespread production facilities. In the petroleum industry, exploration and production facilities are often developed on a large scale in remote areas. Many regions in which the production of petroleum and chemical products occur are environmentally sensitive. The discharge of organic hydrocarbons and related by-products can therefore create an adverse environmental impact, especially with respect to the contamination of soil, silt, clay, sand, gravel, and the like. For example, the contamination of soil with petroleum products (e.g. oil, refined fuels, and similar materials) presents significant containment and decontamination problems. One problem of particular concern involves the need to treat substantial amounts of contaminated materials (e.g. soil) in a rapid and effective manner while avoiding the use of other, potentially harmful chemical agents.

Many attempts have been made to treat large volumes of contaminated solid materials (e.g. soil contaminated with oils and other petroleum products). For example, prior methods involved the incineration of contaminated materials, as well as the burial thereof. These methods either produce additional contaminants (e.g. air pollution in the case of incineration) or result in long-term disposal problems when the contaminated solids are buried. A need therefore remains for a remediation/decontamination system which is able to treat large amounts of solid materials to remove hydrocarbon contaminants therefrom. It is important that the selected treatment process be capable of producing treated materials which may be released into the environment without adverse consequences. It is also important that the selected treatment process accomplish the foregoing goals without using environmentally harmful chemical agents. The present invention as described herein satisfies these goals and enables the removal of hydrocarbon contaminants from solid materials in an environmentally conscious manner while avoiding the problems described above. Accordingly, the invention represents an advance in the art of waste treatment and environmental remediation as discussed in detail below.

SUMMARY OF THE INVENTION

It is an object of the present invention to provide a treatment system for the removal of chemical contaminants from solid materials in a rapid and effective manner.

It is another object of the invention to provide a treatment system for solid materials which is especially useful in the removal of hydrocarbon contaminants from soil compositions (e.g. dirt, sand, gravel, silt, clay, and the like)

It is another object of the invention to provide a treatment system for removing hydrocarbon contaminants from solid materials (e.g. soil compositions) which is readily implemented on a large scale.

It is further object of the invention to provide a treatment system for removing hydrocarbon contaminants from solid materials which involves the use of environmentally compatible, natural product-based solvents.

It is a further object of the invention to provide a treatment system for removing hydrocarbon contaminants from solid materials which is readily applicable to a wide variety of hydrocarbon contaminants and solid materials, and is likewise characterized by a high degree of mobility.

It is a still further object of the invention to provide a treatment system for removing hydrocarbon contaminants from solid materials which avoids the production of secondary pollutants during the treatment process.

It is a still further object of the invention to provide a treatment system for removing hydrocarbon contaminants from solid materials wherein the decontaminated solid materials may be released into the environment without adverse consequences.

It is an even further object of the invention to provide a treatment system for removing hydrocarbon contaminants from solid materials wherein a substantially closed-loop system is used in which treatment agents are actively purified and reused.

In accordance with the foregoing objects, the present invention involves a unique and highly efficient system for removing hydrocarbon contaminants from solid materials. The term "hydrocarbon contaminant" as used herein shall encompass a wide variety of organic materials including but not limited to waste oils, processed fossil fuels, crude oils, petroleum fractions derived from crude oil (petroleum by-products), and organic pesticides. Other materials which may be removed specifically include (1) benzene, toluene, ethylbenzene, and xylene compounds; (2) halogenated solvents; (3) chlorinated biphenyls; as well as other organic compositions which are soluble within the selected solvent materials described below. Accordingly, the present invention shall not be limited with respect to the foregoing classes of organic contaminants which are provided for example purposes.

The term "solid material" as used herein may likewise encompass a wide variety of materials including but not limited to soil compositions (e.g. dirt, gravel, sand, slit, and/or clay), as well as other solids which are substantially insoluble in the selected solvents described herein. In this regard, the present invention shall not be limited to the foregoing solid materials which are again provided for example purposes.

To remove hydrocarbon contaminants from the selected solid materials, the present invention involves a substantially "closed-loop" system in which chemical solvents, processing water, and the like are purified and reused in the system when needed, thereby reducing material costs and environmental impact. To generally accomplish treatment in accordance with the invention (which will be described in detail in the following section entitled "Detailed Description of Preferred Embodiments"), solid materials mixed with hydrocarbon contaminants are first combined with a selected solvent in a containment vessel. While the present invention shall not be limited to any particular solvent, the use of one or more terpene compositions is preferred. Terpenes are best known as primary components of essential oils, and are considered to be natural products. They specifically originate as complex mixtures of flavors and fragrances in higher plants. From a chemical standpoint, terpenes consist of unsaturated organic compounds having the empirical chemical formula $C_{10}H_{18}$. They are further classified as monocyclic (e.g. dipentene), dicyclic (e.g. pinene), or acyclic (e.g. myrcene). Further information regarding terpene compositions will be provided below. Terpenes are preferred for use in the present invention since they are environmentally biocompatible. Exemplary terpene compositions suitable for use in the invention include but are not limited to alpha-pinene, beta-pinene, limonene, terpinolene, alpha-terpinene, gamma-terpinene, beta-phellandrene, para-cymene, 1,4-cineole, 1,8-cineole, and mixtures thereof.

The selected terpene solvent and solid material are combined to form a mixture in which the hydrocarbon contaminant composition is solvated (e.g. dissolved) within the terpene composition. The treated mixture is thereafter washed with water. While the present invention shall not be limited to any particular washing method or system, a preferred embodiment involves placement of mixture within a washing chamber having a first section with at least one primary screen member therein and a second section with at least one secondary screen member therein. Within the washing chamber, the second section is optimally positioned downstream from the first section. The treated mixture is initially moved from the containment vessel onto the primary screen member in the first section of the washing chamber. Thereafter, a supply of washing water is applied to the mixture on the primary screen member in order to produce a drainage product which passes through the primary screen member and a purified solid product which remains on the primary screen member and does not pass therethrough. The drainage product consists of (1) the washing water; (2) the solvent having the hydrocarbon contaminant composition dissolved therein; and (3) finely-divided portions of the solid material small enough to pass through the primary screen member. In contrast, the purified solid product consists of remaining portions of the solid material large enough to prevent passage through the primary screen member.

At this point, in the preferred embodiment described herein, the purified solid product is transferred to the secondary screen member in the second section of the washing chamber. In the second section of the washing chamber, a supply of rinse water is applied to the purified solid product on the secondary screen member, with the rinse water passing therethrough. The use of rinse water in this manner substantially "polishes" the purified solid product. The rinse water which passes through the secondary screen member includes only minimal amounts of fine solid materials and organic compositions since substantially all of these components were removed in the first section of the washing chamber. As a result, the rinse water (after passage through the secondary screen member) can be transferred to the first section of the washing chamber for use in the washing of additional amounts of solid material which subsequently enter the treatment system.

The final step in the washing process involves removal of the purified solid product from the treatment system (e.g. washing chamber) after the application of rinse water as described above. The purified solid product is substantially free from the hydrocarbon contaminant composition, and may thereafter be released into the environment without adverse consequences. At this point, it should be noted that the purified solid product is not sterile and may be used as a suitable habitat and/or biological substrate for added microbial populations, soil builders, microbial nutrients, and native plant seeds as desired.

As noted above, the present invention shall not be limited to any particular type of washing system or components. Modifications of the foregoing process are possible. For example, while the use of a dual stage washing/rinsing process is preferred and produces highly efficient results, the present invention may be modified to involve a single stage washing process depending on site-specific parameters and the extent of contamination. Regarding the type of equipment which can be used in connection with the foregoing process, many different systems may be employed. For example, a preferred system involves a containment vessel having an auger-type feed mechanism which delivers the treated mixture to a cylindrical, axially-rotating washing chamber. The washing chamber preferably includes an interior region therein surrounded by a side wall. Fixedly secured to the inner surface of the side wall is a continuous, upwardly-extending arrangement of helical flights (e.g. a helical flight assembly) having a plurality of evenly-placed baffle members secured to the inner surface of the side wall between the flights. These components enable the efficient mixing and continuous movement of the mixture within the washing chamber during rotation of the chamber. If this type of chamber is used, it may likewise include a first section and a second section downstream from the first section. The first section will preferably have a primary screen member therein consisting of an annular section of screening material which forms the side wall of the washing chamber within the first section. The second section of the washing chamber will preferably have the same general configuration as the first section. Specifically, the second section will include a secondary screen member consisting of an annular section of screening material which forms the side wall of the washing chamber within the second section.

Positioned within the cylindrical washing chamber are a plurality of conduits each having multiple spray nozzles thereon. A first conduit is positioned upstream from the first section of the washing chamber and is designed to deliver additional solvents (e.g. terpene materials) to the mixture as it moves through the chamber. The use of additional solvents is optional and will depend on site-specific considerations involving the type and quantity of contaminants to be removed. A second conduit is positioned within the first section of the washing chamber and is designed to spray washing water onto the mixture as it moves through the first section and passes over the primary screen member. To collect the drainage product which passes through the primary screen member, a collecting tank is located outside of the washing chamber and beneath the first section. Finally, a third conduit is positioned within the second section of the washing chamber and is designed to spray rinse water onto the purified solid product as it moves through the second section and passes over the secondary screen member. To collect the rinse water which passes through the secondary screen member, an additional collecting tank is located outside of the washing chamber and beneath the second section.

Once again, the present invention shall not be limited to the foregoing treatment apparatus. Other units having different structural designs and components may likewise be used for the purposes described herein.

In accordance with the closed-loop characteristics of present invention, the remaining process steps involve treatment of the drainage product and the separation of components therefrom. As discussed below, these components may be reused in other parts of the process, thereby improving operational efficiency and minimizing environmental impact. Specifically, the drainage product (which includes aqueous components, organic components and finely-divided solid materials) is initially separated into a first fraction (which is predominantly organic in character) and a second fraction (which is predominantly aqueous). Separation may be accomplished using numerous methods including but not limited to centrifugation or cyclonic separation. In a preferred embodiment, a first cyclonic separator unit in fluid communication with the washing chamber is provided. The drainage product is thereafter introduced into the first cyclonic separator unit at a fluid pressure sufficient to cause the drainage product to rapidly swirl therein. Rapid swirling of the drainage product causes it to separate into the first and second fractions listed above. The first fraction consists of the solvent (e.g. the selected terpene composition) having the hydrocarbon contaminant composition dissolved therein, and the second fraction consists of the washing water and finely-divided portions of solid material which passed through the primary screen member. The first and second fractions are thereafter removed from the first cyclonic separator unit. The second fraction is then routed to a storage tank for subsequent treatment as described below.

In a preferred embodiment, the first fraction (which is primarily organic in character) is treated to remove any further (e.g. residual) aqueous and solid components therefrom. This may be accomplished using a number of methods including centrifugation or cyclonic separation. Preferably, a second cyclonic separator unit substantially identical to the first cyclonic separator unit is provided. The second cyclonic separator unit is in fluid communication with and downstream from the first cyclonic separator unit. The first fraction is introduced into the second cyclonic separator unit at a fluid pressure sufficient to cause the first fraction to rapidly swirl therein. Swirling of the first fraction in this manner causes it to separate into a third fraction and a fourth fraction. The third fraction consists of the solvent (e.g. the selected terpene material) with the hydrocarbon contaminant composition dissolved therein, and the fourth fraction consists of any residual water and residual solid material which remained in the first fraction after separation of the drainage product into the first and second fractions. The third and fourth fractions are then removed from the second cyclonic separator unit. The fourth fraction is combined with the second fraction in the storage tank to produce a sludge product.

The sludge product is thereafter treated to separate the water therein from the remaining solid materials. In a preferred embodiment, this is accomplished by a centrifuge unit in fluid communication with and downstream from the first and second cyclonic separator units. The sludge product is introduced into the centrifuge unit and rotated at a rotational speed sufficient to separate the sludge product into a fifth fraction and a sixth fraction. The fifth fraction consists of washing water from the second fraction and residual water from the fourth fraction which combine to produce a supply of recycled water. The sixth fraction contains finely-divided portions of solid material from the second fraction and residual solid material from the fourth fraction. The fifth and sixth fractions are then removed from the centrifuge unit. The sixth fraction is thereafter disposed of or released into the environment as desired (which should not cause problems since substantially all of the hydrocarbon contaminant composition has been removed therefrom).

Next, the third fraction is treated in order to remove the hydrocarbon contaminant composition from the solvent (e.g. the selected terpene material). This may be accomplished using a number of conventional processing methods, although fractional distillation is preferred. Specifically, a conventional fractional distillation unit is provided which is in fluid communication with the second cyclonic separator unit. The third fraction is thereafter introduced into the fractional distillation unit, followed by heating of the third fraction in an amount sufficient to fractionally distill and generate a seventh fraction and an eighth fraction from the third fraction. The seventh fraction consists of remaining (e.g. recovered) quantities of the solvent, and the eighth fraction consists of the hydrocarbon contaminant composition. The seventh and eighth fractions are then removed from the fractional distillation unit.

The remaining (e.g. recovered) quantities of terpene solvent from the seventh fraction are thereafter supplied to the initial containment vessel for reuse in the treatment of additional solid materials which enter the treatment system. The reuse of solvents in this manner not only provides a maximum degree of economy, but reduces any storage or disposal problems which may exist regarding the solvent.

Likewise, the supply of recycled water from the fifth fraction is transferred to the washing chamber (e.g. the second section) of the treatment system, where it is reused as rinse water in connection with additional amounts of solid material which enter the system.

Finally, a number of options exist with respect to the recovered hydrocarbon contaminant composition (e.g. the eighth fraction). The hydrocarbon contaminant composition may be stored or disposed of in a conventional manner, depending on the chemical nature of the composition. In a preferred embodiment, if a petroleum based composition is involved (e.g. crude oil, fuel products, or derivatives thereof), the composition may be combusted or burned as an energy source for the generation of heat, electrical power, and the like. Specifically, the treatment system described herein may include a conventional generator system having an internal combustion engine associated therewith. The recovered hydrocarbon contaminant composition would then be supplied to the generator system for use as fuel (alone or in combination with other fuel materials) to generate electricity. In this type of system, it may be necessary to provide a filtering step between the fractional distillation unit and generator system in which the hydrocarbon composition would be passed through a conventional filter unit to remove extraneous solid matter. The extraneous solid matter would then be routed into the initial containment vessel of the treatment system for decontamination as described above.

Finally, the foregoing generator system could include an optional heat exchanger unit designed to pre-heat the third fraction before it enters the fractional distillation unit. Pre-heating of the third fraction would reduce the energy requirements of the fractional distillation unit, thereby improving the energy efficiency of the entire treatment system.

The present invention represents an advanced system for removing hydrocarbon contaminants from solid materials. In accordance with the closed-loop nature of the system, it enables the recycling of water and solvents to achieve a maximum degree of operating efficiency. These and other objects, features, and advantages of the invention shall be described below in the following Brief Description of the Drawings and Detailed Description of Preferred Embodiments.

DETAILED DESCRIPTION OF PREFERRED EMBODIMENTS

The present invention involves a unique and highly efficient method for the decontamination and restoration of solid materials combined with hydrocarbon contaminants. It offers particular utility in the chemical and petroleum industries wherein decontamination on a large scale may be necessary. As stated above, the term "hydrocarbon contaminant" used herein shall encompass a wide variety of hydrocarbon and organic materials including but not limited to waste oils, processed fossil fuels, crude oils, petroleum fractions derived from crude oil (petroleum by-products), and organic pesticides. Other materials which may be removed specifically include (1) benzene, toluene, ethylbenzene, and xylene compounds; (2) halogenated solvents; (3) chlorinated biphenyls, as well as other organic compositions which are soluble within the selected solvent materials described below. Accordingly, the invention shall not be limited to any particular classes or groups of hydrocarbon materials, and is prospectively applicable to a wide variety of organic compositions. The term "solid material" may likewise encompass various materials including but not limited to soil compositions (which typically involve dirt, gravel, sand, silt, and/or clay), as well as other solids which are substantially insoluble in the selected solvent materials. However, the present invention shall not be limited to treatment of the foregoing materials which are again provided for example purposes.

The technology associated with the present invention is based on numerous physical and chemical treatment processes combined in a unique manner. These processes include biochemical solvation, liquid/liquid extraction, liquid/solid extraction, material size classification, mechanical/hydraulic scrubbing, and phase separation of organic and aqueous fractions in a chemical mixture. These techniques cooperatively produce a multi-step process which is able to decontaminate a wide variety of solid materials in a rapid and efficient manner.

Figure 1:
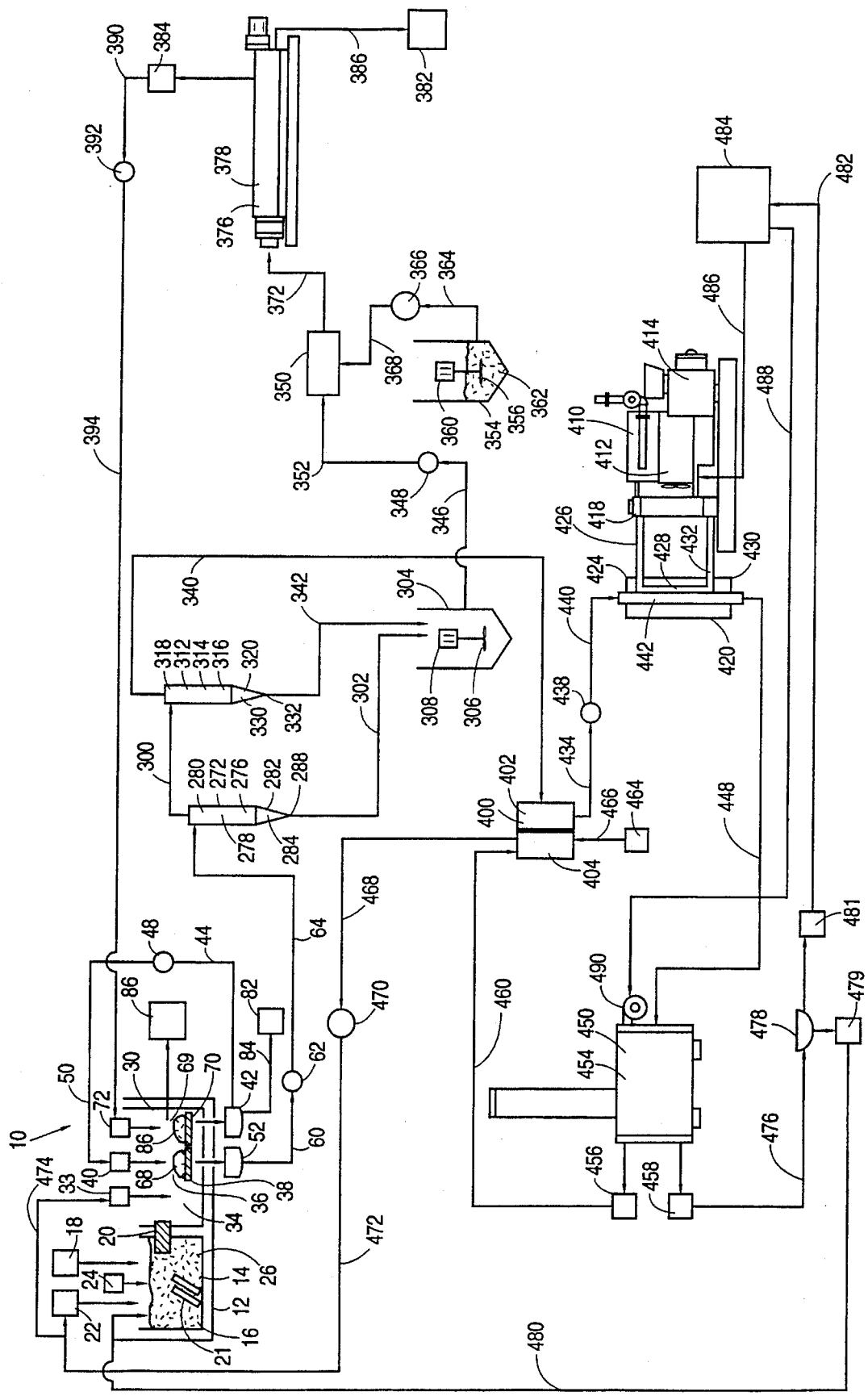
FIG. 1 is a detailed, schematic illustration showing the process steps and components associated with a preferred embodiment of the present invention.

To illustrate the process of the present invention, a schematic flow diagram is provided in FIG. 1. While FIG. 1 represents a preferred embodiment, the invention shall not be specifically limited to the steps and information provided below. Instead, the invention may be modified in accordance with site-specific considerations as necessary and appropriate. With reference to FIG. 1, a schematic representation of an exemplary processing/treatment system is generally designated at reference number 10. The system 10 includes a treatment unit 12 having a containment vessel 14 in the form of a hopper 16. As illustrated in FIG. 1, the containment vessel 14 is initially provided with a supply of solid material 18. The solid material 18 is combined with at least one hydrocarbon contaminant composition. In a preferred embodiment, the solid material 18 is physically manipulated so that any large portions thereof are reduced in size to an easily handled form. The system 10 is capable of treating solid materials generally having individual portions (e.g. particles or chunks) with diameters ranging from about 0.025–60 mm. Size control may be accomplished prior to introduction of the solid material 18 into the containment vessel 14 using conventional means (e.g. standard mechanical grinding/pulverizing systems). Alternatively, size control may be undertaken within the containment vessel 14 using a number of conventional mechanical systems which simultaneously function to transfer the solid material 18 from the containment vessel 14 to subsequent parts of the processing system 10. An exemplary mechanical system for accomplishing these goals would include a motor-driven feed auger 20 illustrated schematically in FIG. 1. In addition, the containment vessel 14 may also include a plurality of optional, motor-driven counter-rotating disks 21 which provide additional mechanical forces sufficient to break up large portions of the solid material 18. It should be noted that all of the physical structures used in the processing system 10 (including but not limited to the containment vessel 14 and associated components) should be constructed of a metal (e.g. stainless steel) or other material which is not chemically affected by the solvent being used for decontamination.

Within the containment vessel 14, the solid material 18 is combined with a supply of a solvent 22 designed to remove the foregoing hydrocarbon contaminant composition from the solid material 18. Specifically, contact between the solvent 22 and the contaminated solid material 18 will cause solvation (e.g. dissolution) of the hydrocarbon composition into the solvent 22. While the present invention shall not be limited to any particular solvent, the use of one or more terpene compositions is preferred. Terpene compositions are best known as primary components of essential oils, and are therefore classified as natural products. They are oligomers of isoprene and originate as complex mixtures of flavors and fragrances in higher plants. From a chemical standpoint, terpenes basically involve unsaturated organic compounds having the empirical chemical formula $C_{10}H_{16}$. These compounds occur in most essential oils and oleo-resins derived from plants, and many exist in the form of alcohols, esters, ethers, ketones, and aldehydes. They are further classified as monocyclic (e.g. dipentene), dicyclic (e.g. pinene), or acyclic (e.g. myrcene). They are commercially available on an industrial scale and can be purchased in volumes typically ranging from about 5–2000 gallons. Many high purity terpenes are used by the food, beverage, and cosmetic industries as fragrance and flavoring compounds. Terpene compositions are preferred solvent materials in the present invention because they are environmentally biocompatible. Exemplary terpenes suitable for use as solvent 22 include but are not limited to the following materials and mixtures thereof:

| | | |
|---|---|---|
| alpha-pinene | | beta-pinene |
| limonene | | terpinolene |
| alpha-terpinene | gamma-terpinene | beta-phellandrene |
| para-cymene | 1,4-cineole | 1,8-cineole |

In particular, 1,4-cineole and 1,8-cineole are classified as terpene ethers which co-elute with terpene hydrocarbons during isolation. All of the foregoing terpene compositions are commercially available from a number of sources including but not limited to the Bush, Boake, and Allen Company (a division of Union Camp Corporation) of Jacksonville, Fla. (U.S.A.).

The amount of solvent 22 to be combined with the solid material 18 in the containment vessel 14 may be varied, depending on the extent of contamination and the type of hydrocarbon contaminant being removed. For most purposes, it is preferred that the solvent 22 (e.g. the terpene composition) be added to the solid material 18 in a solvent: solid material weight ratio of about 1:1 to 6:1. Also, while pre-heating of the solvent 22 is not normally required, pre-heating may enhance separation efficiency in isolated cases determined by preliminary pilot studies on the solid materials being processed. If pre-heating is undertaken, the solvent 22 will normally be heated to a temperature within about 5° C. above the cloud point of the specific solvent being used.

Depending on site-specific considerations, optional separation enhancement agents 24 may be added to the containment vessel 14 in combination with the solid material 18 and solvent 22. These agents 24 typically include various salts (e.g. $CaCl_2$ or NaCl) as well as pH control agents including but not limited to HCl or NaOH. The agents 24 are collectively designed to improve the wettability characteristics of the solid material 18 to create enhanced separation efficiency. As noted above, addition of the agents 24 is optional, depending on site specific considerations, as well as preliminary pilot studies on the solid materials 18 being treated. If one or more separation enhancement agents 24 are used, the amounts thereof to be combined with the solid material 18 are variable, again depending on numerous factors determined by preliminary pilot tests.

Once the solid material 18, solvent 22, and any optional separation enhancement agents 24 are combined within the containment vessel 14, they form a mixture 26 which is transferred by the feed auger 20 (or other conventional conveying system) into a washing chamber 30 schematically illustrated in FIG. 1. Transfer of the mixture 26 from the containment vessel 14 to the washing chamber 30 is typically undertaken in a rapid manner since residence time of the mixture 26 in the containment vessel 14 is minimal. In a preferred embodiment, the mixture 26 will typically reside within the containment vessel 14 for a period of about 3–10 minutes before being transferred to the washing chamber 30. It should also be noted that, immediately upon entry of the mixture 26 into the washing chamber 30, an optional supply of supplemental solvent 33 (preferably of the same type as solvent 22) may be applied to the mixture 26 at position 34 within the washing chamber 30 if desired. Application of the supplemental solvent 33, as well as the amount of solvent 33 to be applied will depend on a variety of extrinsic factors including but not limited to the type of solid material 18 being treated, as well as the hydrocarbon contaminant composition being removed. Preliminary pilot tests may be used to determine whether the application of supplemental solvent 33 will be necessary.

In a preferred embodiment, the washing chamber 30 will include at least one and preferably two screen members therein which are used to facilitate treatment of the solid material 18. In the embodiment of FIG. 1, the washing chamber 30 will include a first section 36 having a primary screen member 38 therein. The primary screen member 38 is typically constructed of conventional metal (e.g. stainless steel) screening material having a preferred mesh size of not less than about 0.1 micron. The term "screen member" as used herein shall also encompass metal plate members or other comparable structures (not shown) having a plurality of perforations or openings therethrough. The mixture 26 is placed directly on the primary screen member 38, followed by the introduction of a supply of washing water 40 thereto. With reference to FIG. 1, the washing water 40 is initially stored within a containment tank 42 of conventional design. When delivery is desired, the washing water 40 passes through line 44 and into pump 48. The washing water then passes through line 50 which terminates above the primary screen member 38 within the first section 36 of chamber 30. The pump 48 (as well as the other pumps described below) are of conventional design. Standard disk flow pumps, screw pumps, centrifugal pumps and the like may be used in connection with all of the pump units discussed herein. In addition, a unique aspect of the processing system 10 is the origin of the washing water 40 as discussed in greater detail below.

In a preferred embodiment, the washing water 40 will be applied at a pressure level of about 50–200 psi, although the selected pressure may vary, depending on the size and configuration of the processing system 10. The amount of washing water 40 to be applied will also vary in view of numerous factors including but not limited to the size and capacity of the processing system 10, as well as the nature of the solid material 18 and hydrocarbon contaminant. In most cases, the application of about 1–4 gallons of washing water 40 per pound of mixture 26 will be sufficient.

As the washing water 40 moves downwardly through the mixture 26, it physically washes the solvent 22 (and dissolved hydrocarbon contaminant) from the mixture 26. In addition, as the washing water 40 passes through the mixture 26, it draws finely-divided portions of the solid material 18 therewith. All of these materials (in combination) pass through the primary screen member 38 and collect within a containment tank 52 positioned outside of the washing chamber 30 and beneath the primary screen member 38 as illustrated in FIG. 1. Accordingly, a drainage product 54 (FIG. 3) is generated which resides within the containment tank 52. The drainage product 54 includes (1) the washing water 40; (2) the solvent 22 having the hydrocarbon contaminant composition dissolved therein; and (3) finely-divided portions of the solid material 18 small enough to pass through the primary screen member 38 (which is used for size classification purposes). The drainage product 54 is thereafter routed from the containment tank 52 through line 60 where it is pumped by pump 62 (e.g. of the same type as pump 48) into line 64. The drainage product 54 is subsequently processed to remove useful components therefrom as described below. The material which remains on the primary screen member 38 will consist of a purified solid product 68 illustrated in FIG. 1. The purified solid product 68 is comprised of remaining portions of the solid material 18 large enough to prevent the passage of such portions through the primary screen member 38. At this stage, the purified solid product 68 has nearly all of the hydrocarbon contaminant composition removed therefrom, and is considered to be effectively decontaminated at this stage. However, in a preferred embodiment, the purified solid product 68 is rinsed with an additional supply of water in order to remove any residual materials and effectively "polish" the product 68. To accomplish this step, the purified solid product 68 is transferred to a second section 69 of the washing chamber 30 which includes a secondary screen member 70 therein. As shown in FIG. 1, the second section 69 is positioned downstream from the first section 36. The secondary screen member 70 is preferably of the same type and configuration as the primary screen member 38. In an alternative embodiment, the secondary screen member 70 may include a mesh size which is different from the primary screen member 38 if further size classification is desired.

After the purified solid product 68 is transferred to the secondary screen member 70, it is rinsed with a supply of rinse water 72. The ultimate origin of the rinse water 72 is a unique aspect of the present invention, and will be described in detail below. After the rinse water 72 passes through the purified solid product 68 and secondary screen member 70, it is collected within the containment tank 42 described above. As shown in FIG. 1, the containment tank 42 is positioned outside of the washing chamber 30 and beneath the secondary screen member 70. Because of the substantially clean character of the rinse water 72 within the tank 42, and in order to conserve water, the rinse water 72 may be transferred to the first section 36 of the washing chamber 30 for use as the washing water 40. Specifically, the rinse water 72 (after it passes through the secondary screen member 70) may be used as the supply of washing water 40 in connection with solid materials on the primary screen member 38. To accomplish this process, the collected water within the containment tank 42 (hereinafter characterized as the washing water 40) passes through line 44, pump 48, and line 50 into the first section 36 of the washing chamber 30 as described above. To ensure an adequate supply of washing water 40, any additional water which may be needed in the system 10 (due to evaporation, spillage, etc.) may be supplied to the containment tank 42 from a supply of feedstock water 82 which is connected to the containment tank 42 via line 84.

At this point, the purification process is completed, and the final solid product 86 (FIGS. 1 and 3) is removed from the washing chamber 30. In accordance with the present invention, the final solid product 86 will have not less than about 98% of the hydrocarbon contaminant composition removed therefrom. At this level, the product 86 may be returned to the environment under most circumstances without adverse consequences (especially if soil materials are involved). It should be noted that the final solid product 86 is not sterile in view of the biologically compatible solvents involved, and may be used as a suitable habitat and/or biological substrate for added microbial populations, soil builders, microbial nutrients, and native plant seeds as desired. Furthermore, depending on the size characteristics of the washing chamber 30 and associated components, as well as the type of materials being treated, the system 10 is capable of treating at least about 20 yd$^3$/hr. of contaminated solid material 18. Accordingly, the system 10 has the capacity to treat large quantities of contaminated materials in a highly effective manner.

Figure 2:
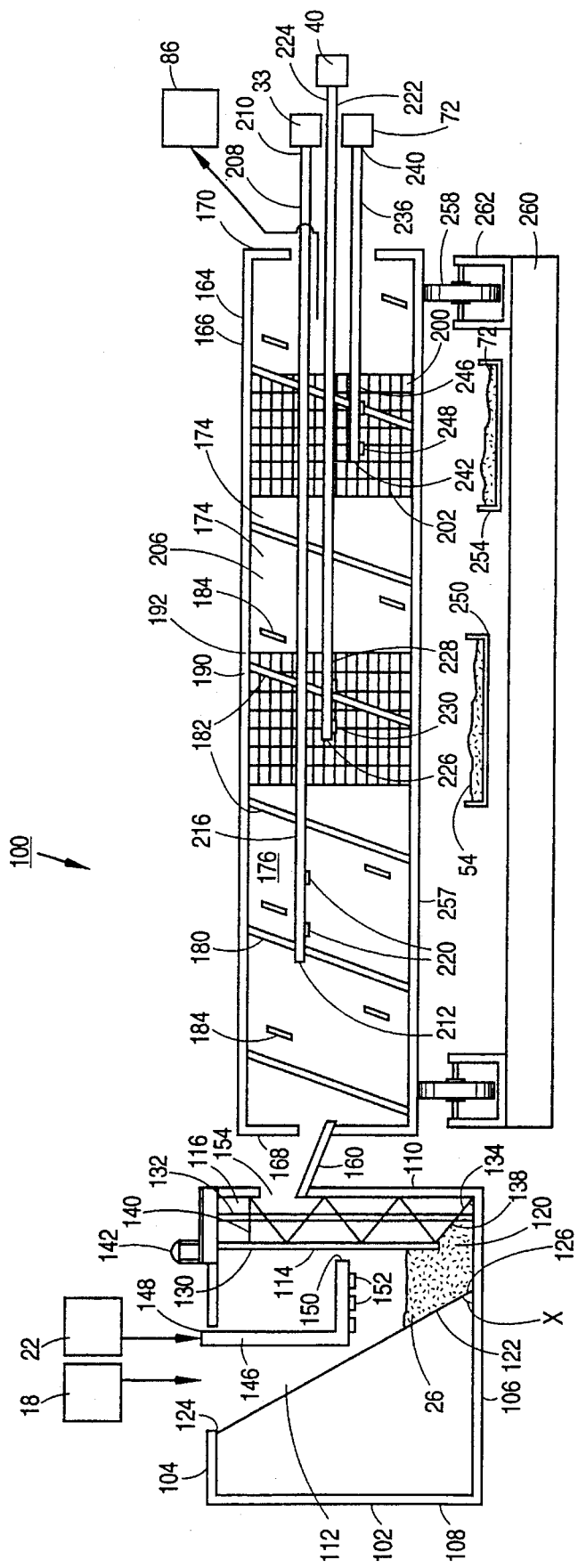
FIG. 2 is a schematic flow diagram corresponding to the embodiment of FIG. 1 which illustrates the multiple separation steps which occur during the treatment process.

As previously indicated, the processing system 10 shall not be limited to the specific containment vessel 14, washing chamber 30, and associated components described above and schematically illustrated in FIG. 1. For example, a number of different devices may be used to initially treat/decontaminate the solid material 18. An exemplary and preferred treatment apparatus 100 suitable for this purpose is schematically illustrated (partially in cross-section) in FIG. 2. With reference to FIG. 2, the apparatus 100 specifically includes a containment chamber 102 which is manufactured from a metal (e.g. stainless steel) that is inert with respect to the solvent being used. While the capacity of the chamber 102 may be varied depending on site-specific conditions including the amount of contaminated solid material to be treated, an optimum and preferred capacity will be about 100–500 lbs. The chamber 102 (shown cross-sectionally in FIG. 2) has a partially open top portion 104, a bottom wall 106, a front wall 108, and a rear wall 110. The chamber 102 also has an interior region 112 designed to receive solid material 18 therein. Located within the interior region 112 and spaced inwardly from the rear wall 110 is an internal wall 114 shown schematically in FIG. 2. Positioned between the rear wall 110 and the internal wall 114 is an open zone 116, the function of which will be described below. The internal wall 114 extends downwardly from the top portion 104 as illustrated and terminates above the bottom wall 106 to form a gap 120 therebetween. Also positioned within the interior region 112 of the chamber 102 is a downwardly-angled wall 122 which forms an acute angle "X" of about 45° relative to the bottom wall 106. The downwardly-angled wall 122 has an outer end 124 and an inner end 126, with the inner end 126 abuttingly engaging the bottom wall 106 (FIG. 2). In addition, the inner end 126 is positioned directly ahead of and spaced apart from the gap 120 as shown.

Positioned within the open zone 116 between the rear wall 110 and internal wall 114 is a vertical screw-type feed auger 130 of conventional design which extends continuously from the bottom wall 106 to the top portion 104 of the chamber 102. The feed auger 130 includes a central shaft 132 having a continuous helical flight assembly 134 secured thereto. The feed auger 130 further includes a lower end 138 which spans the gap 120 between the internal wall 114 and bottom wall 106 as shown in FIG. 2. In addition, the feed auger 130 includes an upper end 140 which is operatively connected to a standard electric motor 142. The entire feed auger 130 is sized so that it may freely rotate within the open zone 116 and not frictionally engage the rear wall 110 and internal wall 114.

Finally, the interior region 112 of the chamber 102 includes a tubular feed conduit 146 partially positioned therein, with the conduit 146 having a first end 148 and a second end 150. The term "tubular" as used herein shall generally signify an elongate structure having a bore or passageway therethrough surrounded by a continuous wall. The first end 148 of the conduit 146 is connected to the supply of solvent 22 as described above. The second end 150 of the conduit 146 is closed so that fluid will not pass therethrough. Positioned between the first end 148 and the second end 150 is a plurality of spray nozzles 152 of conventional design. The spray nozzles 152 are used to deliver solvent 22 from the conduit 146 to solid material 18 within the interior region 112 of the chamber 102. The number of spray nozzles 152 may be varied depending on the desired capacity of the system with which it is used. In a preferred embodiment, about 15–30 spray nozzles 152 may be employed.

With continued reference to FIG. 2, the rear wall 110 of the chamber 102 includes an opening 154 therein which is adjacent the upper end 140 of the feed auger 130. The opening 154 includes an elongate chute 160 which extends outwardly from the rear wall 110. The chute 160 is preferably manufactured from the same material (e.g. stainless steel) used to produce the containment chamber 102. The chute 160 leads into a washing chamber 164 which performs the same functions listed above in connection with the washing chamber 30. In the embodiment of FIG. 2, the washing chamber 164 includes a tubular (e.g. substantially cylindrical) housing 166 having an open first end 168, an open second end 170, a continuous annular side wall 172, and an interior region 174 surrounded by the side wall 172. The housing 166 and associated components are preferably manufactured of the same materials used to produce the containment chamber 102 (e.g. stainless steel), and are shown cross-sectionally in FIG. 2.

Fixedly secured to the inner surface 176 of the side wall 172 and extending outwardly into the interior region 174 is a continuous helical flight assembly 180 which includes a plurality of integrally-connected flight members 182. The flight members 182 are secured by welding or the like to the inner surface 176 of the side wall 172 as schematically illustrated in FIG. 2. The helical flight assembly 180 extends continuously from the first end 168 of the housing 166 to the second end 170 thereof. Uniformly positioned between the flight members 182 of the flight assembly 180 are a plurality of upwardly extending baffle members 184 which are fixedly secured to the inner surface 176 of the side wall 172 by welding or the like. The baffle members 184 preferably consist of upwardly-extending portions of metal, the function of which will be described below. The number of baffle members 184 to be used will vary, depending on site-specific considerations.

Positioned inwardly from the first end 168 of the housing 166 is a first section 190 shown in FIG. 2. The side wall 172 of the housing 166 at the first section 190 consists of an annular section of screening material hereinafter designated as the primary screen unit 192. The primary screen unit 192 may be a continuous annular structure made of metal (e.g. stainless steel) having substantially the same diameter as the side wall 172 of the housing 166. Alternatively, the primary screen unit 192 may actually consist of a plurality of individual arcuate screen sections (not shown) secured together to form an integral structure. The mesh size of the primary screen unit 192 will preferably be not less than about 0.1 micron, although this size may vary depending on the characteristics of the materials being treated. It should also be noted that the helical flight assembly 180 passes over the primary screen unit 192 in order to ensure the efficient and continuous transport of materials through the washing chamber 164.

The housing 166 further includes a second section 200 which is positioned between the first section 190 and the second end 170 of the housing 166. The side wall 172 of the housing 166 at the second section 200 consists of an annular section of screening material hereinafter designated as the secondary screen unit 202. In a preferred embodiment, the secondary screen unit 202 will have the same basic structural characteristics as the primary screen unit 192 described above. Specifically, the secondary screen unit 202 may consist of a continuous annular structure made of metal (e.g. stainless steel) having substantially the same diameter as the side wall 172 of the housing 166. Alternatively, the secondary screen unit 202 may consist of a plurality of individual arcuate screen sections (not shown) secured together to form an integral structure. The mesh size of the secondary screen unit 202 will preferably be not less than about 0.1 micron, although this size may vary depending on the characteristics of the materials being treated and other factors. It should also be noted that the helical flight assembly 180 passes over the secondary screen unit 202 to again ensure the efficient and continuous transport of materials through the washing chamber 164. In a preferred embodiment as shown in FIG. 2, the primary and secondary screen units 192, 202 are separated from each other by an unperforated section 206 of the side wall 172.

With continued reference to FIG. 2, a tubular first conduit 208 is provided, most of which is positioned within the interior region 174 of the housing 166. The first conduit 208 includes a first end 210 and a second end 212. The first end 210 is connected to the supply of supplemental solvent 33 as described above. The second end 212 terminates within the interior region 174 of the housing 166 near the first end 168 of the housing 166. Positioned on section 216 of the first conduit 208 (e.g. between the first end 168 of the housing 166 and the first section 190 thereof) are multiple spray nozzles 220 which allow delivery of the supplemental solvent 33 to materials within the housing 166 before they enter the first section 190. In a preferred embodiment, about 15–30 spray nozzles 220 will be used, although this number may vary, depending on a wide variety of site-specific considerations. As noted above, application of the supplemental solvent 33 using the foregoing components is optional, and will depend on a variety of factors including but not limited to the type of materials being treated, as well as the hydrocarbon contaminant composition to be removed.

Also included as illustrated in FIG. 2 is a tubular second conduit 222, most of which is positioned within the interior region 174 of the housing 166. The second conduit 222 includes a first end 224 and a second end 226. The first end 224 is connected to the supply of washing water 40 described above. The second end 226 terminates within the first section 190 of the housing 166. With continued reference to FIG. 2, the second conduit 222 includes a section 228 which is positioned directly above the primary screen unit 192. The section 228 includes a plurality of spray nozzles 230 attached thereto which allow delivery of the washing water 40 to materials within the housing 166 as they pass over the primary screen unit 192. In a preferred embodiment, about 15–30 spray nozzles 230 will be used, although this number may vary based on a wide variety of site-specific considerations. In accordance with the operational characteristics of the second conduit 222, it will effectively function as first water delivery means in the housing 166.

Finally, as shown in FIG. 2, a tubular third conduit 236 is provided, most of which is positioned within the interior region 174 of the housing 166. The third conduit 236 includes a first end 240 and a second end 242. The first end 240 is connected to the supply of rinse water 72 described above. The second end 242 terminates within the second section 200 of the housing 166. The third conduit 236 shown in FIG. 2 also includes a section 246 which is positioned directly above the secondary screen unit 202 as illustrated in FIG. 2. The section 246 further includes a plurality of spray nozzles 248 attached thereto which allow delivery of the rinse water 72 to materials within the housing 166 as they pass over the secondary screen unit 202. In a preferred embodiment, about 15–30 spray nozzles 248 will be used, although this number may again vary, depending on a wide variety of factors. In accordance with the operational characteristics of the third conduit 236, it will effectively function as second water delivery means in the housing 166.

With continued reference to FIG. 2, a primary containment tank 250 is provided which is positioned outside of the housing 166 of washing chamber 164. The tank 250 is of conventional design, and is preferably constructed of the same materials (e.g. stainless steel) used in connection with the housing 166. While the size of the tank 250 may vary depending on the desired capacity of the washing chamber 164, the tank 250 will preferably have a preferred capacity of about 250–500 gallons. In addition, the tank 250 is positioned directly beneath and spaced outwardly from the first section 190 of the housing 166 (e.g. directly beneath the primary screen unit 192). In this manner, the tank 250 may be used to collect liquid and solid materials which pass through the primary screen unit 192 from the interior region 174 of the housing 166.

A secondary containment tank 254 is also provided which is positioned outside of the housing 166 of washing chamber 164. The tank 254 is of conventional design, and is preferably of the same type and capacity as the primary containment tank 250. In a preferred embodiment, the tank 254 is positioned directly beneath and spaced outwardly from the second section 200 of the housing 166 (e.g. directly beneath the secondary screen unit 202). In this manner, the tank 254 may be used to collect materials which pass through the secondary screen unit 202 from the interior region 174 of the housing 166.

Finally, the exterior surface 257 of the housing 166 is preferably in frictional engagement with a plurality of roller units 258 (only two being schematically shown in FIG. 2) which are operatively connected to a motor drive system (not shown). Each of the roller units 258 is preferably made of rubber or resilient plastic, and is secured to a support frame 260 using a metal U-shaped mounting bracket 262 which is conventional in structure and design.

In order to use the washing chamber 164, solid material 18 to be processed is first placed within the interior region 112 of the containment chamber 102. Solvent 22 is then combined with the solid material 18 in the chamber 102 using the feed conduit 146 and associated spray nozzles 152. The resulting mixture 26 is thereafter directed toward the bottom wall 106 of the chamber 102 by the downwardly-angled wall 122. As the mixture 26 flows toward the bottom wall 106, it enters the gap 120 illustrated in FIG. 2. The mixture 26 is then transported upwardly by the feed auger 130 which is rotated using the motor 142 (e.g. at an exemplary speed of about 5–20 rpm). The feed auger 130 not only transports the mixture 26 in an efficient manner, but also agitates and mixes the solid material 18 and solvent 22 to facilitate the decontamination process.

The feed auger 130 ultimately delivers the mixture 26 to the chute 160 in the rear wall 110 of the chamber 102. As shown in FIG. 2, the chute 160 is positioned so that it extends into the open first end 168 of the housing 166 associated with the washing chamber 164. As the mixture 26 passes from the chute 160 into the washing chamber 164, the housing 166 is rotated using the motor-driven roller units 258 (e.g. at an exemplary speed of about 5–20 rpm). Rotation of the housing 166 causes corresponding rotation of the helical flight assembly 180 therein which moves the mixture 26 through the housing 166. As the mixture 26 moves toward the first section 190 of the housing 166, it may be sprayed with the supplemental solvent 33 using the first conduit 208 and associated spray nozzles 220. The mixture 26 is thereafter moved by the helical flight assembly 180 into the first section 190 where it comes in contact with the primary screen unit 192. When the mixture 26 passes into the first section 190, washing water 40 is applied thereto from the second conduit 222 and associated spray nozzles 230. The drainage product 54 as described above moves through the primary screen unit 192 and is collected within the primary containment tank 250 for subsequent treatment as indicated below.

Continued rotation of the housing 166 causes the resulting purified solid product (not shown) on the primary screen unit 192 to move toward and into the second section 200 of the housing 166. When the purified solid product enters the second section 200, it comes in contact with the secondary screen unit 202. Within the second section 200 of the housing 166, the purified solid product is rinsed with rinse water 72 supplied from the third conduit 236 and associated spray nozzles 248. The rinse water 72 which passes through the secondary screen unit 202 contains a minimal amount of contaminants and solids, and is retained within the secondary containment tank 254. As previously noted, the rinse water 72 within the tank 254 may be used as the washing water 40 which is directed back into the first section 190 of the washing chamber 164.

Additional rotation of the housing 166 and helical flight assembly 180 moves the resulting final solid product 86 toward and through the second end 170 of the housing 166 where it may be collected and used as desired. The treatment apparatus 100 of FIG. 2 operates in a highly efficient manner to treat substantial amounts of contaminated solid material. When properly configured in accordance with site-specific considerations, the treatment apparatus 100 is prospectively capable of treating at least about 20 yd$^3$/hr. or more of solid material. In this regard, the apparatus 100 is an effective system for implementing the processes described herein. However, as noted above, the present invention shall not be limited exclusively to the use of apparatus 100. Other systems with similar capabilities and different components may also be used.

Figure 3:
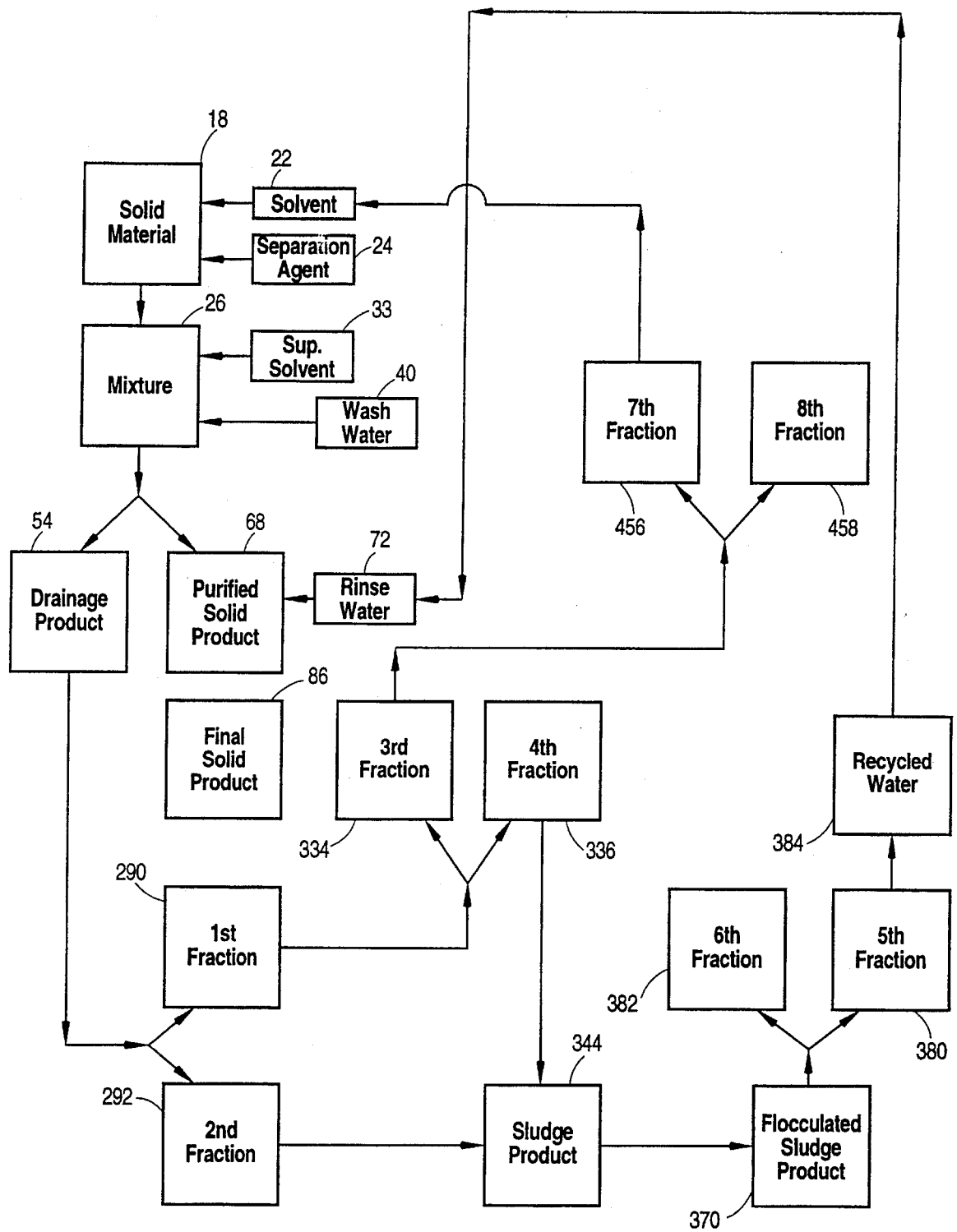
FIG. 3 is a schematic, cross-sectional illustration of an exemplary containment vessel and washing chamber suitable for use in the embodiment of FIG. 1.

Referring back to FIG. 1, the drainage product 54 from the containment tank 52 beneath the washing chamber 30 is now treated to recover the solvent 22 and water therefrom. Treatment of the drainage product 54 in accordance with a preferred embodiment of the invention is illustrated in FIG. 1. In addition, the treatment process is schematically illustrated in the flow diagram of FIG. 3. As previously noted, the drainage product 54 involves a combination of (1) the washing water 40; (2) the solvent 22 having the hydrocarbon contaminant composition dissolved therein; and (3) finely-divided portions of the solid material 18 small enough to pass through the primary screen member 38. After passing through line 60, the drainage product 54 is pumped by pump 62 into line 64. As the drainage product 54 passes through line 64, it enters into a first separating means 272 which is in fluid communication with the treatment unit 12. The first separating means 272 preferably involves a primary cyclonic separator unit 276 of a type well known in the art for separating mixtures of material. The cyclonic separator unit 276 includes a chamber 278 having an upper end 280 and a lower end 282. As illustrated in FIG. 1, the lower end 282 tapers inwardly in order to form an inverted cone-like structure 284 having an apex 288. The cyclonic separator unit 276 enables separation of the drainage product 54 into various liquid and solid components. Specifically, the drainage product 54 enters the chamber 278 of the cyclonic separator unit 276 at the upper end 280 thereof via line 64. The pump 62 introduces the drainage product 54 into the cyclonic separator unit 276 at a fluid pressure sufficient to cause the drainage product 54 to begin rapidly swirling therein. This pressure will normally be about 30–1500 psi. It should be noted that the selected fluid pressure within the foregoing range will depend on the size and configuration of the cyclonic separator unit 276. In a preferred embodiment, a fluid pressure should be chosen in accordance with preliminary pilot tests so that internal forces within the cyclonic separator unit 276 will range from about 600–1000 g. Swirling of the drainage product 54 in the foregoing manner causes it to separate into a first fraction 290 and a second fraction 292 (FIG. 3). Separation is accomplished in accordance with known and established physical principles associated with the operation of cyclonic separation systems. In a preferred embodiment, the cyclonic separator unit 276 uses a "closed apex design" in which materials are intermittently discharged. Specifically, fluid release from the cyclonic separator unit 276 only occurs when the apex 288 of the unit 276 is opened. As a result, operation of the entire processing system 10 is more precisely controlled. It should be noted that the first separating means 272 shall not be exclusively limited to the use of cyclonic separator unit 276. In contrast, other separation systems known in the art and suitable for the purposes set forth herein may also be used including but not limited to conventional centrifuge systems (e.g. three-phase decanting centrifuge units), membrane filtration devices, and the like.

The first fraction 290 is predominantly organic in character, and will mostly consist of the solvent 22 having the hydrocarbon contaminant composition dissolved therein. The first fraction 290 may also include very small amounts of residual water and residual solid materials therein which will be removed as described below. The second fraction 292 will be aqueous in character, and will primarily consist of the washing water 40 in combination with finely-divided portions of solid material 18 which passed through the primary screen member 38 into the containment tank 52. In accordance with fluid pressures generated within the processing system 10 by the pump 62, the first fraction 290 will leave the cyclonic separator unit 276 through a line 300 which is operatively connected to the upper end 280 of the unit 276. In contrast, the second fraction 292 will leave the cyclonic separator unit 276 through the lower end 282 (e.g. the apex 288) where it will flow through a line 302 into a sludge tank 304 (FIG. 1) of conventional design having a mixing blade 306 therein which is operatively connected to a standard electric motor 308.

The first fraction 290 passes from line 300 at a pressure of about 30–1500 psi (generated by the pump 62) into a second separating means 312 which is in fluid communication with the first separating means 272. The second separating means 312 preferably involves a secondary cyclonic separator unit 314 of a type well known in the art for the purposes described herein. The secondary cyclonic separator unit 314 is in fluid communication with and downstream from the primary cyclonic separator unit 276 as shown in FIG. 1. In a preferred embodiment, the secondary cyclonic separator unit 314 is of substantially the same design as the primary cyclonic separator unit 276, and includes a chamber 316 having an upper end 318 and a lower end 320. As schematically illustrated in FIG. 1, the lower end 320 tapers inwardly to form an inverted cone-like structure 330 having an apex 332. In accordance with the present invention, the first fraction 290 enters the chamber 316 of the cyclonic separator unit 314 at the upper end 318 thereof via line 300. The first fraction 290 enters the cyclonic separator unit 314 at a fluid pressure sufficient to cause the first fraction 290 to rapidly swirl therein. This pressure will normally be about 30–1500 psi as stated above. It should be noted that the selected fluid pressure within the foregoing range will depend on the size and configuration of the cyclonic separator unit 314. In a preferred embodiment, a fluid pressure should be chosen in accordance with preliminary pilot tests so that internal forces within the cyclonic separator unit 314 will range from about 600–1000 g. Swirling of the first fraction 290 causes it to separate into a third fraction 334 and a fourth fraction 336 (FIG. 3). Separation is again accomplished in accordance with known and established physical principles involving cyclonic separation systems. In a preferred embodiment, the secondary cyclonic separator unit 314 uses a "closed apex design" in which materials are intermittently discharged as described above regarding the primary cyclonic separator unit 276. It should again be noted that the second separating means 312 shall not be exclusively limited to cyclonic separator unit 314. Instead, other separation systems known in the art and suitable for the purposes set forth herein may also be used including but not limited to conventional centrifuge systems (e.g. three-phase decanting centrifuge units), membrane filtration devices, and the like.

The third fraction 334 will be organic in character, and will consist of the solvent 22 having the hydrocarbon contaminant composition dissolved therein. The fourth fraction 336 will be aqueous in character, and will primarily consist of very small amounts of residual water and residual solid materials which remained in the first fraction 290 after separation of the drainage product 54 into the first and second fractions 290, 292. The third fraction 334 will thereafter leave the secondary cyclonic separator unit 314 through line 340 which is operatively connected to the upper end 318 of the unit 314. The fourth fraction 336 will leave the cyclonic separator unit 314 through the lower end 320 thereof (e.g. the apex 332). The fourth fraction 336 will thereafter flow through line 342 into the sludge tank 304 (FIG. 1). Within the sludge tank 304, the fourth fraction 336 is combined with the second fraction 292 using the mixing blade 306 driven by the motor 308. As shown in FIG. 3, the second fraction 292 combines with the fourth fraction 336 to form a sludge product 344 which is routed through line 346 into a pump 348 (e.g. of the same general design as pump 48). The sludge product 344 is thereafter directed by the pump 348 into an in-line mixing compartment 350 via line 352.

With continued reference to FIG. 1, the processing system 10 preferably includes a tank 354 of conventional design having a mixing blade 356 therein which is driven by a standard electric motor 360. The tank 354 includes a supply of a chemical flocculent 362 therein. Exemplary flocculent materials suitable for this purpose include but are not limited to anionic, cationic, and/or zwitterionic colloid compositions which are well known in the art. A specific composition that will function effectively for the foregoing purposes is a product sold under the name PERCOL™ 722 by Allied Colloids of Suffolk, Va. (U.S.A.). Other known colloid compositions are commercially available from the Calgon Corp. of Pittsburgh, Pa. (U.S.A.). The flocculent 362 is added to the sludge product 344 in order to cause fine solid materials therein to flocculate into larger units which are more readily removed in subsequent parts of the system 10. The flocculent 362 is fed from the tank 354 into a line 364 which leads into a pump 366 (e.g. of the same type as pump 48). The pump 366 thereafter directs the flocculent 362 into the in-line mixing compartment 350 via line 368. Within the mixing compartment 350, the flocculent 362 combines with the sludge product 344 to flocculate fine solid materials as described above. The flocculated sludge product 370 (FIG. 3) is then directed through line 372 into a third separating means 376 which is in fluid communication with the first separating means 272 and the second separating means 312. In a preferred embodiment, the third separating means 376 consists of a centrifuge unit 378 (e.g. of standard flow-through two-phase design). However, other conventional separation systems may be used instead of the centrifuge unit 378, with the present invention not being limited to any particular separation system. For example, cyclonic separation systems, membrane filtration systems, and the like may also be used.

Within the centrifuge unit 378, the flocculated sludge product 370 is centrifugally separated into a fifth fraction 380 and sixth fraction 382 (FIG. 3). Exemplary rotational speeds within the centrifuge unit 378 will be about 1000–6000 rpm. The specific speed to be used within this range will depend on the size and configuration of the centrifuge unit 378 being used. In a preferred embodiment, a rotational speed should be chosen in accordance with preliminary pilot tests so that internal forces within the selected centrifuge unit 378 will range from about 3000–10,000 g. The fifth fraction 380 consists of water from the second fraction 292 and residual water from the fourth fraction 336 which combine to produce a supply of recycled water 384 as illustrated in FIG. 3. The sixth fraction 382 consists of finely-divided portions of solid material from the second fraction 292 and residual solid materials from the fourth fraction 336. The sixth fraction 382 is routed out of the centrifuge unit 378 via line 386, and is thereafter retained or disposed of as desired. Because the sixth fraction 382 is substantially free from the initial hydrocarbon contaminant composition, it may be returned to the environment in combination with the final solid product 86 described above (especially if soil compositions are involved.)

The fifth fraction 380 (which consists of the supply of recycled water 384) is thereafter routed through line 390 and into pump 392 (e.g. of the same type as pump 48). The pump 392 directs the supply of recycled water 384 through line 394 which terminates at the second section 69 within the washing chamber 30. In a preferred embodiment, the line 394 terminates directly above the secondary screen member 70. The supply of recycled water 384 may thereafter be used as rinse water 72 in the second section 69 of the washing chamber 30 in order to rinse additional amounts of solid material which enter the processing system 10. In this manner, conservation of water is achieved, thereby minimizing the environmental impact caused by processing system 10 and greatly improving its operational efficiency. It should be noted that the recycled water 384 may be collected in a separate tank (not shown) prior to use as the rinse water 72, or may be used immediately in the second section 69 as described above. Likewise, lines 390 and 394 shall collectively be designated as first conduit means for transferring the recycled water 384 (e.g. the fifth fraction 380) from the third separating means 376 to the washing chamber 30.

The third fraction 334 (which includes the solvent 22 combined with the hydrocarbon contaminant composition) is passed through line 340 (FIG. 1) into a solvent collecting tank 400 having a first compartment 402 and a second compartment 404. The line 340 is in fluid communication with the first compartment 402 as illustrated. After passing through line 340, the third fraction 334 enters the first compartment 402 of tank 400 and is temporarily collected therein.

As described below, the hydrocarbon materials combined with the solvent 22 will be ultimately be separated from the solvent 22. The hydrocarbon materials may then be combusted as fuel, depending on the chemical nature of the materials. If the hydrocarbon materials are usable as fuel, they may be combusted within a conventional generator system 410 schematically illustrated in FIG. 1. An exemplary generator system 410 will include an internal combustion engine 412 of standard design which is operatively connected to a standard electrical generator unit 414. In a preferred embodiment, the engine 412 will include a fluid cooling system known in the art comprising a radiator 418 preferably having glycol-type coolant therein. To improve the efficiency of system 10 regarding subsequent purification (e.g. distillation) of the third fraction 334, the third fraction 334 may be pre-heated (e.g. to a preferred temperature of about 100°–150° C.). Pre-heating reduces the amount of energy consumption in subsequent stages of the system 10. In a preferred embodiment wherein the generator system 410 is used, heating means 420 may be provided in the form of a conventional heat exchanger 424 which is operatively connected to the radiator 418. As schematically shown in FIG. 1, the heat exchanger 424 includes a first conduit 426 in fluid communication with the radiator 418. The first conduit 426 is also connected to a second conduit 428 within a housing 430 which forms part of the heat exchanger 424.

The second conduit 428 is thereafter connected to a third conduit 432 which leads out of the housing 430 and back to the radiator 418. Using these components, heated coolant fluid from the radiator 418 is passed through the housing 430 via the first, second, and third conduits 426, 428, 432. To pre-heat the third fraction 334, it is fed from the tank 400 through line 434 which is connected to a pump 438 (e.g. of the same type as pump 48). The pump 438 thereafter directs the third fraction 334 through a line 440 which leads into the housing 430 of the heat exchanger 424. Within the housing 430, a fourth conduit 442 is provided which is connected to the line 440. As schematically illustrated in FIG. 1, the fourth conduit 442 and second conduit 428 (both of which are preferably manufactured of copper or other heat conductive metal) are positioned directly adjacent to and against each other within the housing 430. In this manner, heat from the hot coolant fluid passing through the second conduit 428 is conductively transferred to the fourth conduit 442. As a result, the third fraction 334 is heated as it passes through the fourth conduit 442. The heated third fraction 334 leaves the fourth conduit 442 (and heat exchanger 424) via line 448 as illustrated. It should be noted that use of the generator system 410 (and heat exchanger 424) is optional and not a required part of the processing system 10. If an electrical generator system is desired, a number of different generator units may be used, and the present invention shall not be limited to any particular system. Also, the present invention shall not be limited to the heat exchanger 424 and components described above. Alternative pre-heating means may be used including but not limited to conventional jacket-type electrical heating systems and other comparable units.

The third fraction 334 passing through line 448 is thereafter routed into a fourth separating means 450 which is in fluid communication with the second separating means 312. The fourth separating means 450 preferably involves a fractional distillation unit 454 of conventional design. In particular, an exemplary fractional distillation unit 454 will consist of a reboiler to vaporize liquids, a condenser to condense vapors to a liquid state, and trays or packing material to provide liquid/vapor contact (not shown), all of which are standard components. Within the fractional distillation unit 454, the third fraction 334 is heated to a temperature sufficient to vaporize and separate the solvent 22 from the hydrocarbon contaminant composition. The temperature necessary to accomplish this goal will vary, depending on the chemical nature of the solvent 22 being used. With respect to the terpene compositions described above, the distillation temperature of interest will broadly range from about 150°–200° C. Table 1 provides temperature ranges at which about of the solvent of interest will be vaporized and removed from the third fraction 334:

TABLE 1

| Solvent | Distillation Temp. Range (°C.) |
| --- | --- |
| alpha-pinene | 155–157 |
| beta-pinene | 166–168 |
| limonene | 175–177 |
| terpinolene | 189–191 |
| alpha-terpinene | 178–180 |
| gamma-terpinene | 180–182 |
| beta-phellandrene | 168–170 |
| para-cymene | 176–178 |
| 1,4-cineole | 172–174 |
| 1,8-cineole | 175–177 |

Use of the fractional distillation unit 454 will generate a seventh fraction 456 and an eighth fraction 458 (FIG. 3). The seventh fraction 456 will consist of solvent 22, while the eighth fraction 458 will consist of the hydrocarbon contaminant composition. The seventh fraction 456 (which specifically consists of a supply of recovered solvent 22) is thereafter routed via line 460 into the second compartment 404 of the tank 400 where it is collected for subsequent use as described below. Within the tank 400, it is preferred that the seventh fraction 456 be augmented with a supply of make-up solvent 464 (preferably of the same type as solvent 22). This is due to evaporative losses of the solvent 22 during the foregoing procedures, as well as losses encountered during distillation. The make-up solvent 464 is supplied to the second compartment 404 of the tank 400 via line 466. A determination as to how much make-up solvent 464 will be needed (if any) can be undertaken in accordance with site-specific preliminary pilot studies. However, it is reasonable to assume that at least about a 10% solvent loss will occur as a result of distillation and processing in system 10.

The seventh fraction 456 (and any added make-up solvent 464) is thereafter routed via line 468, pump 470 (e.g. of the same type as pump 48), and line 472 back into the containment vessel 14 for use as solvent 22 in the treatment any additional amounts of solid material which enter the processing system 10. In this manner, the system 10 enables the efficient and economical use of solvent materials with a minimal degree of environmental impact. It should also be noted that all or part of the seventh fraction 456 (and any make-up solvent 464 associated therewith) may be routed via line 474 into the washing chamber 30 for use as the supply of supplemental solvent 33 if needed. Likewise, lines 460, 468, and 472 shall collectively be designated as second conduit means for transferring the seventh fraction 456 from the fourth separating means 450 to the containment vessel 14.

Finally, the eighth fraction 458 (consisting of the isolated hydrocarbon contaminant composition) is routed via line 476 from the fractional distillation unit 454 into an optional filter 478 of conventional design. An exemplary filter 478 will consist of a standard 100 micron paper filter unit with a supporting screen structure (not shown). However, other conventional filter materials may be used (including membrane systems known in the art), and the present invention shall not be limited to any particular filter media. The filter 478 is designed to remove any residual fines and other extraneous solid matter from the hydrocarbon contaminant composition. Filtration in this manner is of particular importance if the hydrocarbon contaminant composition is to be combusted as fuel. The collected solids 479 (if any) may be then be disposed of or placed back into the containment vessel 14 via line 480 for treatment (since they will have at least some of the hydrocarbon contaminant composition associated therewith). The filtered eighth fraction 481 may thereafter be stored, used as fuel, or disposed of as desired. If the filtered eighth fraction 481 is suitable for use as a fuel product (e.g. if it consists of petroleum products such as diesel fuel or fuel oil), it may be routed through line 482 into a fuel storage tank 484. From the fuel storage tank 484, the filtered eighth fraction 481 may be used (e.g. burned or combusted) as fuel in a number of ways. For example, as illustrated in FIG. 1, the filtered eighth fraction 481 may be sent through line 486 to the internal combustion engine 412 of the generator system 410 for use as fuel. Likewise, all or part of the filtered eighth fraction 481 may be routed by line 488 to a burner-type heating apparatus 490 used in the fractional distillation unit 454.

Figure 4:
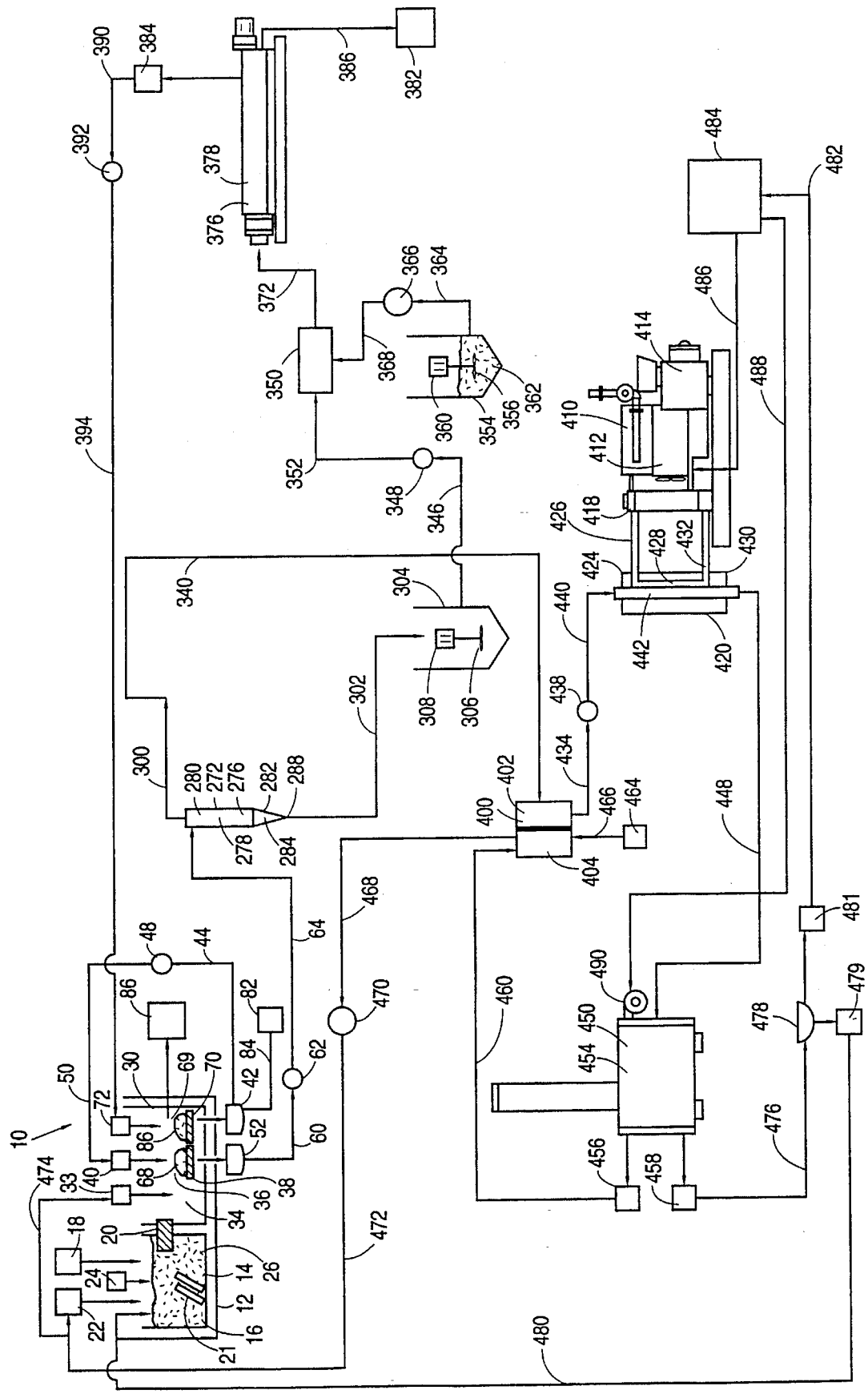
FIG. 4 is a detailed, schematic illustration showing the process steps and components associated with an alternative embodiment of the invention.

As described herein, the processing system 10 enables the rapid and efficient treatment of soil and other solid materials contaminated with hydrocarbon compositions. The closed-loop nature of the system 10 enables conservation of water and solvent materials, thereby reducing environmental impact and operating costs. Various modifications to the system 10 may be made, depending on a wide variety of external factors including but not limited to (1) the type of solid material being decontaminated; (2) the amount of solid material to be treated; and (3) the chemical nature of the hydrocarbon contaminant composition involved. For example, an alternative system 500 is illustrated in FIG. 4. All of the components and operating characteristics of system 500 are substantially identical to those of system 10 unless otherwise indicated below. With reference to FIG. 4, the system 500 is simplified to treat solid materials with a reduced degree of contamination. For example, in system 500, the second section 69 of the washing chamber 30 has been eliminated, along with the secondary screen member 70 and the application of rinse water 72. Instead, the purified solid product 68 is removed from the washing chamber 30 directly after the application of washing water 40 in the first section 36 of the chamber 30. In the system 500, the supply of recycled water 384 generated from the centrifuge unit 378 is routed via line 390, pump 392, and line 394 directly to the containment tank 42 as illustrated. The recycled water 384 is then used as the washing water 40 in the first section 36 of the chamber 30 as described above. The rinsing step associated with the secondary screen member 70 in the embodiment of FIG. 1 is primarily designed as a "polishing" step, and may not be absolutely necessary in certain cases involving minimally-contaminated solid materials.

The system 500 has also been simplified to omit the second separating means 312 (e.g. the secondary cyclonic separator unit 314) along with line 342. Instead, the first fraction 290 from the first separating means 272 (e.g. the primary cyclonic separator unit 276) is routed through lines 300, 340 into subsequent parts of the system 500 for treatment as described above with respect to system 10. As previously indicated, the first fraction 290 is organic in character and primarily includes the solvent 22 in combination with the hydrocarbon contaminant composition. With continued reference to FIG. 4, the first fraction 290 is ultimately introduced into the fractional distillation unit 454, with solvent 22 being separated from the hydrocarbon contaminant composition in order to generate a supply of recovered solvent 22.

In the embodiment of FIG. 4, the second fraction 292 (which is aqueous in character) is routed from the cyclonic separator unit 276 through line 302 into the sludge tank 304. The second fraction 292 is subsequently treated in the centrifuge unit 378 to separate water and solid materials as described above relative to system 10. It should be noted that, in the alternative system 500, the centrifuge unit 378 shall be considered as the second separating means, and the fractional distillation unit 454 shall be considered as the third separating means since the secondary cyclonic separator unit 314 has been omitted. Accordingly, in the system 500, the first separating means (the cyclonic separator unit 276) is in fluid communication with both the second separating means (the centrifuge unit 378) and the third separating means (the fractional distillation unit 454).

In addition, it is important to emphasize that the basic processing techniques and components described above may be further varied in view of numerous site-specific considerations. The alternative embodiment of FIG. 4 represents only one example wherein modifications have been made to the preferred system of FIG. 1. Regarding alternative embodiments, the present invention shall not be exclusively limited to the system 500 of FIG. 4. For example, the system 500 may be further modified to include a washing chamber 30 having the second section 69 and secondary screen member 70 therein. The functional capabilities of these components are described above. If such a further alternative system were used (which omitted the second separating means 312 but included the second section 69 with the secondary screen member 70 therein), the supply of recycled water 384 generated from the centrifuge unit 378 would be routed via line 390, pump 392, and line 394 to the second section 69 and used as rinse water therein. Likewise, the use of screen members in the washing chambers of systems 10, 500 may be eliminated and substituted with other conventional and equivalent support structures.

To demonstrate the effectiveness of the present invention in treating solid materials contaminated with hydrocarbon compositions, the following Examples are provided:

EXAMPLE 1

In this Example, a mixture of soil, clay, sand and gravel containing about 0.6–1.5% by weight waste crude oil was treated with a selected terpene solvent in accordance with the present invention. Specifically, limonene was used as the terpene solvent in a pilot-scale system comparable to the treatment apparatus 100 illustrated in FIG. 2. The contaminated mixture was combined with solvent and washed in a single step. The following parameters were used as listed in Table 2:

TABLE 2

| Parameter | Specification |
| --- | --- |
| High Pressure Water Wash | 12.58 ± 0.102 l/min. |
| Solvent Flow Rate | 80.0 ml/min. |
| System Volume (total) | 78.9 l |
| Solids Feed | 1.0 kg/min. |
| Aqueous Fluid Turnover | 6.3 min. |
| Rotational Speed of Washing Chamber | 8.03 ± 1.52 rpm |
| Retention Time (total) | 97.30 ± 4.50 sec. |
| Contact Time between Mixture and Solvent | 64.8 sec. |

Approximately 95% of the treated mixture was recovered for analysis. Analysis was conducted using conventional supercritical fluid extraction procedures followed by gas chromatograph analysis with a flame ionization detector. Analytical results indicated that about 98.44% (+1.45%) of the hydrocarbon contaminants were removed from the solid materials. Washing water quality was monitored on-line for pH, turbidity, temperature, conductivity, salinity, oxidative reductive potential, and dissolved oxygen. The water was determined to have no toxicity when evaluated using an assay system recommended by the U.S. Environmental Protection Agency sold under the trademark POLYTOX by Polybac, Inc. of Bethlehem, Pa. (U.S.A.). During the decontamination procedure, the water had a pH of 8.45–8.48, a temperature of 21.9°–23.5° C., a conductivity of 0.476–0.492 mS/cm, a salinity of 0.2%, an oxidative reductive potential of 207–210 mV, and a dissolved oxygen content of 6.83–9.27 mg/l. Turbidity increased from an initial level of 4 to >800 NTU as the capacity of the pilot system was reached. As a result, the water became milky from the presence of non-coalesced terpenes. However, the water cleared in about 36 hours. With the addition of a moderately cationic flocculent (e.g. a composition sold under the name PERCOL™ 722 by Allied Colloids of Suffolk, Va. (U.S.A.)), samples of the water cleared in less than about 24 hours.

EXAMPLE 2

In the pilot-scale system described above in Example 1, gravel materials containing about 1.33% by weight (±0.2%) crude oil were processed. The gravel materials (individually sized between about 2–20 mm in diameter) were specifically contaminated with oil containing 62.68% by weight aliphatic hydrocarbons, 22.53% by weight aromatic hydrocarbons, 6.38% by weight pentane soluble resins, and 6.40% by weight non-pentane soluble resins (asphaltenes). Elemental analysis indicated that the crude oil also contained 0.35% by weight nitrogen and 3.24% by weight sulfur. Using the process of the present invention as described above in Example 1, contamination of the gravel materials was reduced to 0.018% using a gravel feed rate of 200 g/min., a washing chamber rotational speed of 8.0 rpm, and a terpene (limonene) feed rate of 80 ml/min. Treated samples were evaluated for moisture retention by evaporation at 180° C. and residual hydrocarbon content by U.S. Environmental Protection Agency method number 3540. Residual moisture was indicated to be 1.6% (+0.2%).

As indicated in the foregoing Examples and described above, the present invention represents an advance in the art of decontamination technology. It enables the efficient removal of hydrocarbon contaminants from solid materials in a closed-loop system which reduces the amount of water and solvents needed for processing. Having herein described preferred embodiments of the invention, it is anticipated that suitable modifications may be made thereto by individuals skilled in the art which nonetheless remain within the scope of the invention. Accordingly, the present invention shall only be construed in connection with the following claims:

We claim:

1. An apparatus for removing hydrocarbon contaminants from solid materials comprising:

a containment vessel sized to receive a mixture therein comprising a supply of solid material combined with at least one hydrocarbon contaminant composition and a solvent designed to remove said hydrocarbon contaminant composition from said solid material;

a washing chamber operatively connected to said containment vessel, said washing chamber comprising at least one screen member therein, said screen member being sized to receive said mixture thereon from said containment vessel, said washing chamber further comprising first water delivery means therein positioned above said screen member for delivering a supply of washing water onto said screen member and said mixture thereon in order to produce a purified solid product which remains on said screen member and a drainage product which passes through said screen member, said drainage product comprising said washing water, said solvent with said hydrocarbon contaminant composition dissolved therein, and finely-divided portions of said solid material small enough to pass through said screen member;

first separating means in fluid communication with said washing chamber for separating said drainage product into a first fraction and a second fraction, said first fraction comprising said solvent with said hydrocarbon contaminant composition dissolved therein, and said second fraction comprising said washing water and said finely-divided portions of said solid material which passed through said screen member;

second separating means in fluid communication with said first separating means for separating said first fraction into a third fraction and a fourth faction, said third fraction comprising said solvent with said hydrocarbon contaminant composition dissolved therein, and said fourth fraction comprising any residual water and residual solid material which remained in said first fraction after said separating of said drainage product into said first fraction and said second fraction;

third separating means in fluid communication with said first separating means and said second separating means for receiving a combination of said second fraction and said fourth fraction therefrom and separating said combination into a fifth fraction and a sixth fraction, said fifth fraction comprising said washing water from said second fraction and said residual water from said fourth fraction which combine to produce a supply of recycled water, with said sixth fraction comprising said finely-divided portions of said solid material from said second fraction and said residual solid material from said fourth fraction;

first conduit means connected to and between said third separating means and said washing chamber for transferring said fifth fraction from said third separating means to said washing chamber for use therein;

fourth separating means in fluid communication with said second separating means for separating said third fraction into a seventh fraction and an eighth fraction, said seventh fraction comprising a supply of recovered solvent, and said eighth fraction comprising said hydrocarbon contaminant composition; and second conduit means connected to and between said fourth separating means and said containment vessel for transferring said seventh fraction from said fourth separating means to said containment vessel for use therein.

2. The apparatus of claim 1 wherein said first separating means comprises a primary cyclonic separator unit.

3. The apparatus of claim 1 wherein said second separating means comprises a secondary cyclonic separator unit.

4. The apparatus of claim 1 wherein said third separating means comprises a centrifuge unit.

5. The apparatus of claim 1 wherein said fourth separating means comprises a fractional distillation unit.

6. The apparatus of claim 1 wherein said at least one screen member comprises a primary screen member within said washing chamber and a secondary screen member within said washing chamber, said apparatus further comprising second water delivery means within said washing chamber for delivering a supply of rinse water onto said secondary screen member, said second water delivery means being positioned directly above said secondary screen member, and said first water delivery means being positioned directly above said primary screen member.

7. An apparatus for removing hydrocarbon contaminants from solid materials comprising:

a containment vessel sized to receive a mixture therein comprising a supply of solid material combined with at least one hydrocarbon contaminant composition and a solvent designed to remove said hydrocarbon contaminant composition from said solid material;

a washing chamber operatively connected to said containment vessel, said washing chamber comprising at least one screen member therein, said screen member being sized to receive said mixture thereon from said containment vessel, said washing chamber further comprising first water delivery means therein positioned above said screen member for delivering a supply of washing water onto said screen member and said mixture thereon in order to produce a purified solid product which remains on said screen member and a drainage product which passes through said screen member, said drainage product comprising said washing water, said solvent with said hydrocarbon contaminant composition dissolved therein, and finely-divided portions of said solid material small enough to pass through said screen member;

first separating means in fluid communication with said washing chamber for separating said drainage product into a first fraction and a second fraction, said first fraction comprising said solvent with said hydrocarbon contaminant composition dissolved therein, and said second fraction comprising said washing water and said finely-divided portions of said solid material which passed through said screen member;

second separating means in fluid communication with said first separating means for separating said washing water from said finely-divided portions of said solid material in said second fraction so that said washing water is recovered from said second fraction in order to generate a supply of recycled water;

first conduit means connected to and between said second separating means and said washing chamber for transferring said supply of recycled water from said second separating means to said washing chamber for use therein;

third separating means in fluid communication with said first separating means for separating said solvent from said hydrocarbon contaminant composition in said first fraction in order to generate a supply of recovered solvent; and second conduit means connected to and between said third separating means and said containment vessel for transferring said supply of recovered solvent from said third separating means to said containment vessel for use therein.

* * * * *